United States Patent [19]
Sanami

[11] Patent Number: 6,014,368
[45] Date of Patent: Jan. 11, 2000

[54] PACKET MULTIPLEXING SYSTEM

[75] Inventor: Jun Sanami, Tokyo, Japan

[73] Assignee: OKI Electric Industry Co., Ltd., Tokyo, Japan

[21] Appl. No.: 08/813,306

[22] Filed: Mar. 10, 1997

[30] Foreign Application Priority Data

Mar. 11, 1996 [JP] Japan ................................ 8-052829

[51] Int. Cl.$^7$ ................. H04J 3/16; H04N 7/08
[52] U.S. Cl. ................. 370/242; 370/471; 370/474; 348/423; 348/467; 714/798; 714/819
[58] Field of Search ................. 370/242, 244, 370/249, 389, 470, 471, 474; 348/461, 466, 467, 469, 487, 423, 441; 714/798, 799, 819, 820, 821, 824

[56] References Cited

U.S. PATENT DOCUMENTS

| | | | |
|---|---|---|---|
| 4,330,885 | 5/1982 | Abbott et al. | 370/17 |
| 4,376,998 | 3/1983 | Abbott et al. | 370/13 |
| 4,412,323 | 10/1983 | Abbott et al. | 370/16 |
| 4,413,335 | 11/1983 | Clements et al. | 370/16 |
| 4,456,989 | 6/1984 | Johnson et al. | 370/389 |
| 4,920,534 | 4/1990 | Adelmann et al. | 370/474 |
| 5,384,770 | 1/1995 | Mays et al. | 370/474 |
| 5,521,927 | 5/1996 | Kim et al. | 370/389 |
| 5,598,415 | 1/1997 | Nuber et al. | 370/474 |
| 5,680,389 | 10/1997 | Douglas et al. | 370/242 |

FOREIGN PATENT DOCUMENTS 0504 537A1  9/1992  European Pat. Off. .

OTHER PUBLICATIONS

"Technical Diagnostics and Automatic Redundancy in Digital Television Trunk Lines", S.S. Kogan; 1298 Telecommunications and Radio Engineering, vol. 47, No. 3; Mar. 1, 1992, pp. 13–19.

"MPEG–2: A Tutorial Introduction to the Systems Layer", P.A. Sarginson; Institution of Electrical Engineers Colloquium on MPEG (XP000560804),(Jan. 1, 1995), pp. 4/1–4/13.

*Primary Examiner*—Alpus H. Hsu
*Attorney, Agent, or Firm*—Rabin & Champagne, P.C.

[57] ABSTRACT

A multiplexing system which detects multiplexing errors, includes PES packetizing modules that packetize elementary streams (ES) to produce packetized elementary streams (PES), and a TS/PS packetizing module that multiplexes packetized elementary streams (PES) to produce transport streams (TS) or program streams (PS). Comparators are provided each to compare a non-packetized elementary stream (ES) or a packetized elementary stream (PES) stored in a FIFO memory with the packetized elementary stream (ES) or packetized elementary stream (PES) from the packetizing modules. Based on the comparison result, a control module detects errors in the packetizing modules.

8 Claims, 5 Drawing Sheets

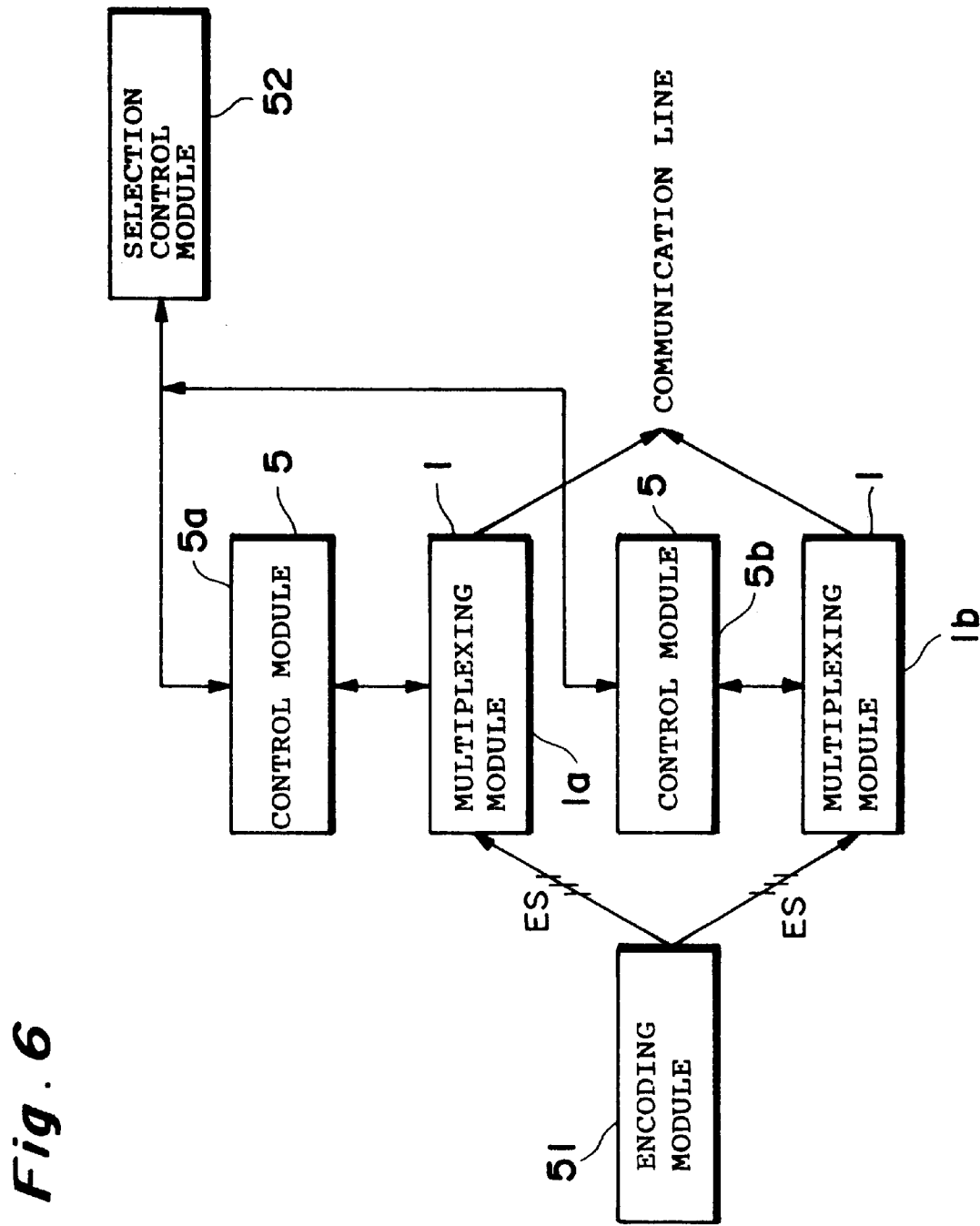

PACKET MULTIPLEXING SYSTEM

BACKGROUND OF THE INVENTION

1. Field of the Invention

The present invention relates to a packet multiplexing system which divides input data into a plurality of packets to multiplex the packets for output. The invention relates particularly to a packet multiplexing system which compares input data with the corresponding data in a packet.

2. Description of the Prior Art

MPEG2 (Moving Picture Expert Group 2), one of encoding systems for compressing moving pictures, has been used to generate packets of various types of data such as image data, voice data, text data, and so forth. These packets are multiplexed, recorded on recording media, and sent over communication lines. MPEG2 defines the recommendations for a unit receiving multiplexed packets, that is a de-multiplexing system, but not for a multiplexing system. Therefore, a multiplexing system may be designed as long as a de-multiplexing system satisfies the recommended performance.

A conventional packet multiplexing system has the video PES packetizing module 61, voice PES packetizing module 62, private data PES packetizing module 63, and TS/PS packetizing module 64 as shown in FIG. 2. The three packetizing modules, video PES packetizing module 61, voice PES packetizing module 62, and private data PES packetizing module 63, packetize elementary streams (ES), such as video data, voice data, and private data, respectively, which are sent from the encoding module (not shown). The packetizing modules 61, 62, and 63 then generate packetized elementary streams (PES) shown in FIG. 3. Next, the TS/PS packetizing module 64, in turn, packetizes those PESs, generate transport streams (TS) or program streams (PS) shown in FIGS. 4 and 5, and outputs them.

In addition, this packet multiplexing system compares non-multiplexed data and multiplexed data in the stream to check if input data is set up correctly in the stream. More specifically, the packet multiplexing system has a circuit (not shown) functionally equivalent to the packet de-multiplexing module which should be in a de-multiplexing system. This circuit, almost as large as the multiplexing system in size, de-multiplexes the multiplexed transport streams (TS) or program streams (PS) into elementary streams (ES); that is, video data, voice data, and private data elementary streams (ES), and then checks if the de-multiplexed elementary streams (ES) match the original elementary streams (ES).

However, the monitor circuit in the conventional packet multiplexing system is too large and expensive, which leads to difficulties to provide a compact and low-cost packet multiplexing system.

SUMMARY OF THE INVENTION

To solve the above problem, a packet multiplexing system according to the present invention generates, based on input data, a packet containing the input data and a header, and compares the data in the generated packet and the input data. This allows determination of whether input data matches data in a generated packet. Therefore, the packet multiplexing system according to this invention is compact and low-cost as compared with the conventional packet multiplexing system.

BRIEF DESCRIPTION OF THE DRAWINGS

The present invention will be understood more fully from the detailed description and the accompanying drawings below of the preferred embodiments of the invention.

In the drawings:

FIG. 6 is a block diagram showing the configuration of a multiplexing system according to the second embodiment of this invention.

DESCRIPTION OF THE PREFERRED EMBODIMENTS

The multiplexing system according to the present invention may be employed to the multiplexing module of an encoder which multiplexes image data, voice data, and private data compression-encoded using a compression technology such as MPEG2.

First Embodiment

Figure 1:
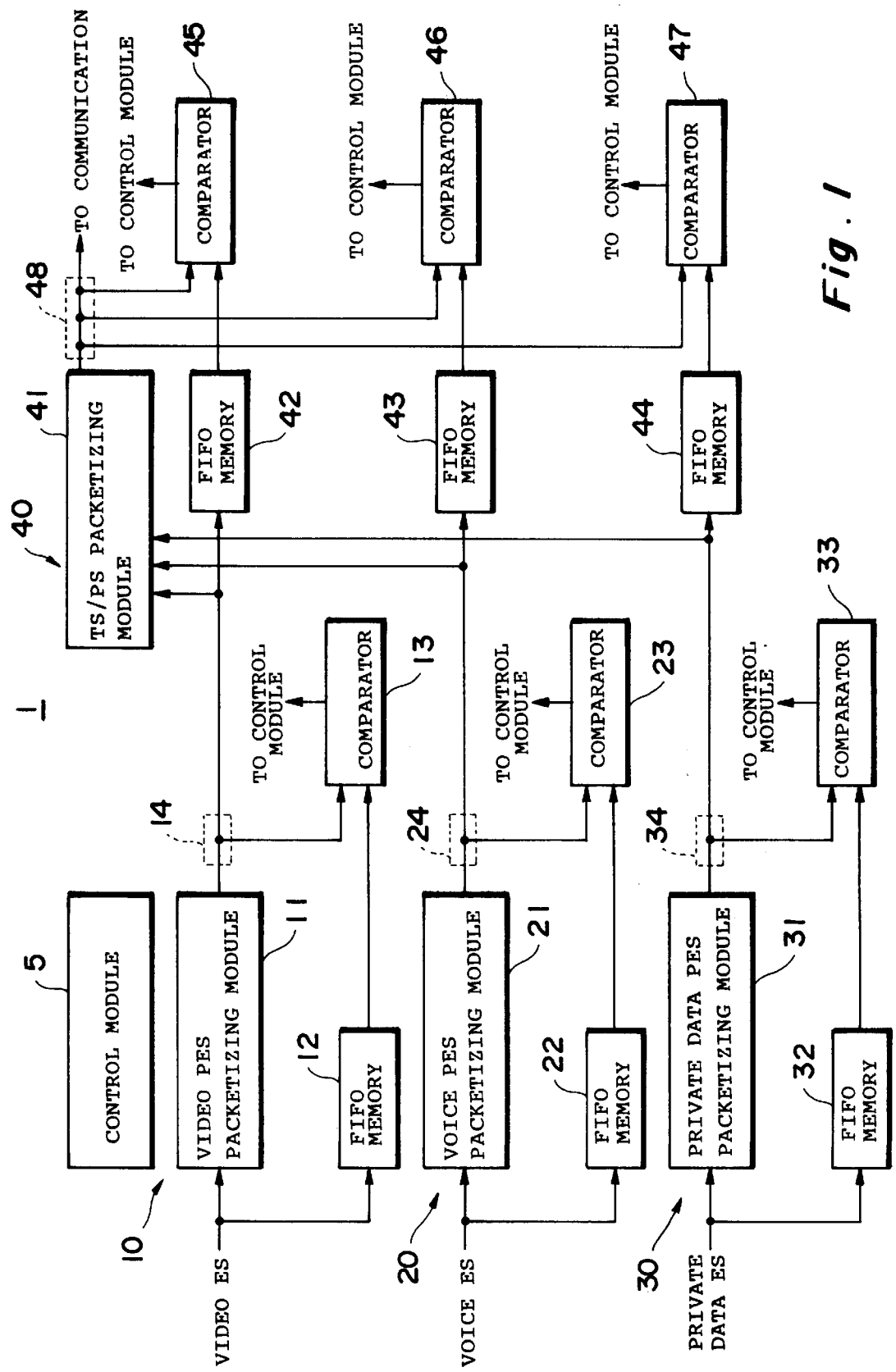
FIG. 1 is a block diagram showing the configuration of a multiplexing system according to the first embodiment of this invention.
Figure 2:
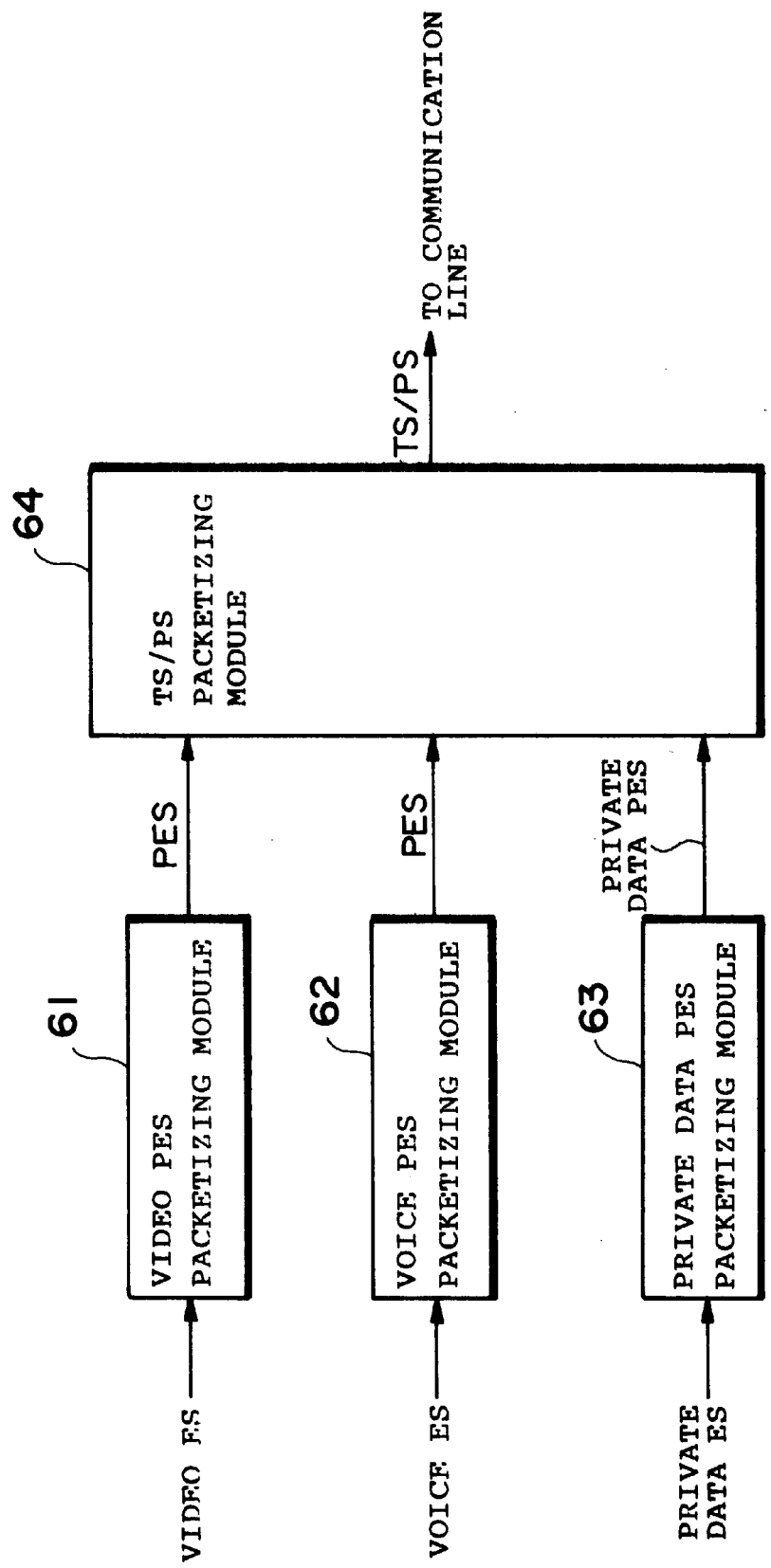
FIG. 2 is a block diagram showing the configuration of a conventional multiplexing system.

In the first embodiment, the present invention is applied to the multiplexing module of such an encoder. As shown in FIG. 1, this multiplexing module includes three packetizing systems which packetize data sent from the encoding module of the encoder. Three packetizing systems are: the video packetized elementary stream (PES) packetizing system 10 which packetizes video data, voice PES packetizing system 20 which packetizes voice data, and private data PES packetizing system 30 which packetizes private data. In addition, the multiplexing module has the TS/PS packetizing system 40 which multiplexes the packetized elementary streams sent from the PES packetizing systems 10, 20, and 30.

The video PES packetizing system 10 includes a video PES packetizing module 11 to packetize the video data elementary stream ES, a First In First Out (FIFO) memory 12 to store non-packetized video data, and a comparator 13 to compare non-packetized video data with packetized video data. The voice PES packetizing system 20 and the private data PES packetizing system 30 each have the same configuration as that of the video PES packetizing system 10. More specifically the voice PES packetizing system 20 and the private data PES packetizing system 30 have respectively a voice PES packetizing module 21 to packetize voice data elementary streams and the private data PES packetizing module 31 to packetize private data elementary streams, respectively, a FIFO memory 22 to store non-packetized voice data and a FIFO memory 32 to store non-packetized private data, and respectively a comparator 23 to compare non-packetized voice data and packetized voice data and a comparator 33 to compare non-packetized private data and packetized private data.

Figure 3:
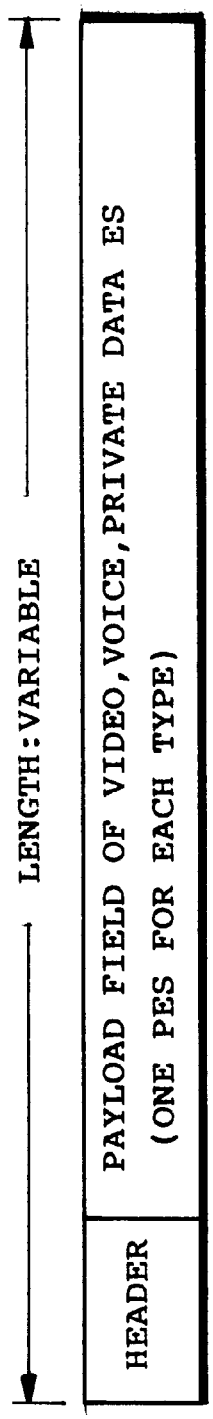
FIG. 3 is a diagram showing the format of a packetized elementary streams (PES)

Each of the PES packetizing modules 11, 21, and 31 adds a header and other information to an elementary stream (ES) sent from the respective encoding module to form a packetized elementary stream (PES) shown in FIG. 3. The length of a packetized elementary stream (PES) is variable.

The PES packetizing module 11, 21, or 31 requires some time to process an elementary stream (ES) to form a packetized elementary stream (PES). This results in a time delay between time when an elementary stream (ES) is sent to the packetizing module 11, 21, or 31 and time when a packetized elementary stream (PES) is produced. To compare a packetized elementary stream (PES) with an elementary stream (ES), the payload field of the packetized elementary stream (PES) shown in FIG. 3, and the elementary stream (ES), must be simultaneously sent to the corresponding comparator 13, 23 or 33. In short the FIFO memory, 12, 22, or 32, need only be large enough to contain an elementary stream (ES) that is sent within the delay time of the corresponding PES packetizing modules 11, 21, or 31; if the input data rate is "V" and the delay time is "T", then the FIFO memory size "M" need only be at least "V"×"T".

To synchronize a packetized elementary stream (PES) with an elementary stream (ES), the FIFO memory delays the elementary stream (ES) by a predetermined time (e.g., the sum of the time required to create the header and the time to create the packetized elementary stream (PES)). However, the time required to generate a packetized elementary stream varies from time to time. So, it is desirable that, instead of predetermining a time for the FIFO memory, the packetizing module monitors the generation of a packetized elementary stream and sends an elementary stream to the FIFO memory when the packetized elementary stream is generated.

Figure 4:
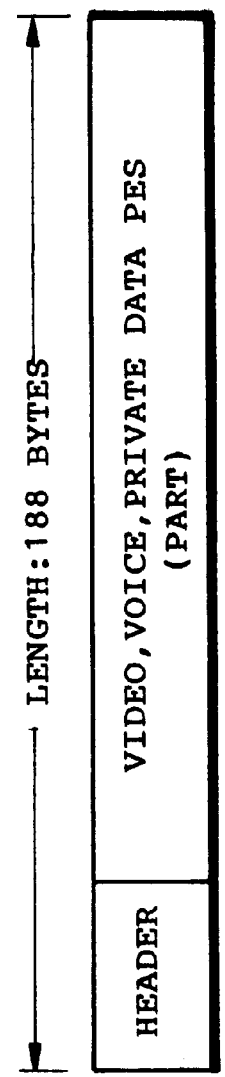
FIG. 4 is a diagram showing the configuration of a transport stream (TS)
Figure 5:
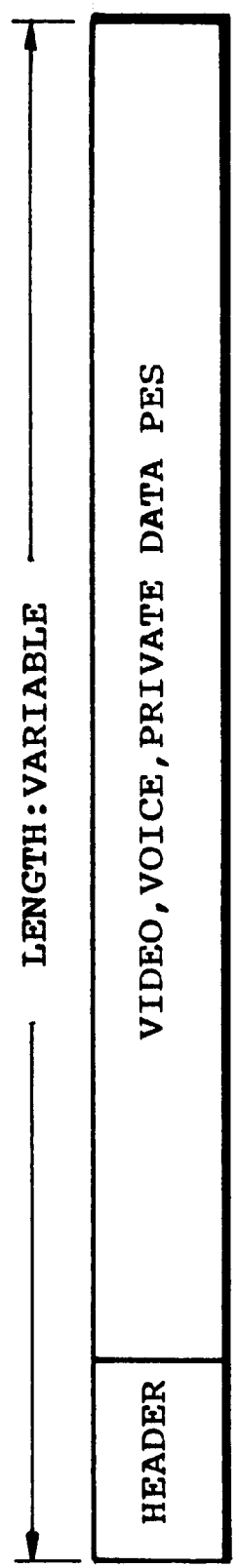
FIG. 5 is a diagram showing the configuration of a program stream (PS)

The TS/PS packetizing system 40 has (1) the TS/PS packetizing module 41 to multiplex packetized elementary streams (PES) sent from the PES packetizing modules 11, 21, and 31, to form a transport stream (TS) as shown in FIG. 4 or a program stream (PS) as shown in FIG. 5, (2) a FIFO memories 42, 43, and 44 to store non-multiplexed packetized elementary streams (PES) from the above-mentioned PES packetizing modules 11, 21, and 31, and (3) comparators 45, 46, and 47 to compare the non-multiplexed packetized elementary streams (PES) and the packetized elementary streams (PES) multiplexed by TS/PS packetizing module 41.

A transport stream (TS) contains one or more packetized elementary streams (PES) divided into data items each of a specified length. Thus, depending upon the length of a packetized elementary stream (PES), a plurality of packetized elementary streams (PES) form one transport stream (TS) or, conversely, one packetized elementary stream (PES) extends across a plurality of transport streams (TS). A program stream (PS), which is created by adding a header to a packetized elementary stream (PES), is never divided.

Because multiplexing requires some time, there is a time delay between a time when a packetized elementary stream (PES) is sent to the TS/PS packetizing module 41 and a time when a transport stream (TS) or a program stream (PS) is output. Therefore, as with the FIFO memories 12, 22, and 32, the FIFO memories 42, 43, and 44 each must be large enough to hold packetized elementary streams (PES) that are output, for the duration of the delay time, in order to send them to the comparators 45, 46, and 47 at the same time that a transport stream (TS) or a program stream (PS) is sent from the TS/PS packetizing module 41 to the comparators 45, 46, and 47.

In the multiplexing module with a configuration described above, the elementary streams (ES) of video data, voice data, and private data are sent from the encoding module to the video PES packetizing module respectively 11, voice PES packetizing module 21, and private data PES packetizing module 31 before being packetized. The elementary streams (ES) are also sent to he FIFO memories 12, 22, and 32.

The video PES packetizing module 11 adds a header and some other information to the elementary stream (ES) of the received image data to form a packetized elementary stream (PES). It then sends this packetized elementary stream (PES) to the comparator 13 and the FIFO memory 42.

From the packetized elementary stream (PES) sent from the video PES packetizing module 11, the comparator 13 extracts the part corresponding to the elementary stream (ES) and compares it with the elementary stream (ES) before packetizing sent from the FIFO memory 12. If there is no error in the packetized elementary stream (PES) generated by the video PES packetizing module 11, the non-packetized elementary stream (ES) should match the packetized elementary stream (ES); if there is an error, the non-packetized elementary stream (ES) should not match the packetized elementary stream (ES). In the latter case, the comparator 13 informs the control module of the condition.

The other two packetizing modules, the voice PES packetizing module 21 and the private data PES packetizing module 31, do the same processing. More specifically, they add headers to the respectively received elementary streams (ES), to form packetized elementary streams (PES) and send them to the comparator 23 and the FIFO memory 43, and to the comparator 33 and the FIFO memory 44, respectively.

From the packetized elementary stream (PES) sent from the PES packetizing module 21 or 31, the comparator 23 or 33 extracts the part corresponding to the elementary stream (ES) and compares it with the non-packetized elementary stream (ES) sent from the FIFO memory 22 or 32 and informs the control module 5 of the result.

In this manner, the control module 5 receives the result of comparison between the non-packetized elementary stream (ES) and the packetized elementary stream (ES). This allows the control module 5 to check whether or not an error was generated during execution of any of the packetizing modules 11, 12, and 13.

Packetized elementary streams (PES) from the PES packetizing modules 11, 21, and 31 are sent to the TS/PS packetizing module 41. The TS/PS packetizing module 41 multiplexes the packetized elementary streams (PES) output from the PES packetizing modules 11, 21, and 31, to form a transport stream (TS) or a program stream (PS), and sends this transport stream (TS) to the communication line and to each of the comparators 45, 46, and 47.

From a transport stream (TS) or a program stream (PS), the comparator 45 extracts the part corresponding to the packetized elementary stream (PES) of video data and compares it with the non-multiplexed packetized elementary stream (PES) stored in the FIFO memory 42, and informs the control module of the comparison result. When the comparator 45 receives a transport stream (TS) from the TS/PS packetizing module 41, it restores an individual packetized elementary stream (PES) by combining or dividing packetized elementary streams (PES) contained in the transport stream (TS). It then extracts a restored packetized elementary stream (PES). This is because each transport stream (TS) contains a part of a packetized elementary stream (PES) or a combination of a plurality of packetized elementary streams (PES). When the comparator 45 receives a program stream (PS) from the TS/PS packetizing module 41, it deletes the header from the program stream (PS) and extracts the packetized elementary stream (PES). Then, the comparator 45 compares the extracted packetized elementary stream (PES) with the non-multiplexed packetized elementary stream (PES) stored in the FIFO memory 42 and sends the comparison result to the control module 5.

The other two comparators 46 and 47 do the same processing. That is, the comparator extracts voice data or private data from a transport stream (TS) or a program stream (PS), compares the extracted data with the non-multiplexed packetized elementary stream (PES) stored in the FIFO memory 43 or 44, and informs the control module 5 of the comparison result.

Based on the comparison result sent from each of comparators 13, 23, 33, 45, 46, and 47, the control module 5 checks if an error occurred in the PES packetizing modules 11, 21, 31 or in the TS/PS packetizing module 41 and, based on the result, controls the operation of the packetizing module 11, 21, 31, or 41. For example, when no error is found in the packetizing module 11, 21, 31, or 41, the control module 5 treats the output from that packetizing module as valid; conversely, if an error is found in the packetizing module 11, 21, 31, or 41, the control module 5 treats the output as invalid. Or, the control module 5 may be designed so that it can tell the packetizing module to re-generate the transport stream (TS) or program stream (PS) when there is an error in the packetizing module 11, 21, 31, or 41.

As described above, this system has the FIFO memories 12, 22, and 32 to compare an non-packetized elementary stream (ES) with that a packetized elementary stream (ES). The result indicates whether an error occurred in any of the PES packetizing modules. This system also has the FIFO memories 42, 43, and 44 to compare a non-multiplexed packetized elementary stream PES with a multiplexed packetized elementary stream PES. The result indicates whether an error occurred in the TS/PS packetizing module 41. Compared with a system with a separate de-multiplexing module, this simply-configured system detects a data error in the payload field that may occur in the multiplexing module, increasing reliability.

In addition, use of the FIFO memories eliminates the need for the comparators 13, 23, 33, 45, 46, and 47 or the control module 5 to manage the location of an elementary stream (ES) or a packetized elementary stream (PES), thereby reducing the processing load.

This multiplexing module also has a FIFO memory and a comparator for each elementary stream (ES) and a packetized elementary stream (PES), thus enabling the control module to identify which packetizing module has an error.

Second Embodiment

In the second embodiment, the present invention is applied to a multiplexing system which has a plurality of multiplexing modules and which selects the output from an error-free multiplexing module. As shown in FIG. 6, this multiplexing system has two sets with the configuration shown in FIG. 1, each set including the multiplexing module 1 and the control module 5. This system also has the selection control module 52 to select one of the multiplexing modules, depending upon the error output from the control modules 5a and 5b of the multiplexing modules 1a and 1b.

The comparators 13, 23, 33, 45, 46, and 47 in each of the multiplexing modules 1a and 1b send to the control modules 5a and 5b the result of comparison between a non-packetized elementary stream (ES) and a packetized elementary stream (ES) as well as the result of comparison between a non-multiplexed packetized elementary stream (PES) and a multiplexed packetized elementary stream (PES).

Each of the control modules 5a and 5b checks the comparison output from the comparators 13, 23, 33, 45, 46, and 47 to check to see if there is a comparison error and, if it finds an error, informs the selection control module 52 of the error. Based on the information from the control modules 5a and 5b, the selection control module 52 checks if an error occurred in the multiplexing modules 1a and 1b. The selection control module 52 then controls the TS/PS packetizing module 41 in the multiplexing modules 1a and 1b in such a way that a transport stream (TS) or a program stream (PS) from an error-free multiplexing module 1a or 1b is output to the communication line or some other unit.

For example, an error in one of the packetizing modules 11, 21, 31, and 41 shows that a packetizing error or a multiplexing error occurred and that the non-packetized elementary stream (ES) or packetized elementary stream (PES) and the packetized elementary stream (ES) or packetized elementary stream (PES) differ. When one of the comparators 13, 23, 33, 45, 46, and 47 finds this difference, the control module 5a or 5b finds an error, causing the selection control module 52 to select an error-free multiplexing module 1a or 1b. Therefore, this multiplexing system is able to output an error-free transport stream (TS) or a program stream (PS), increasing the reliability of the multiplexing module.

Another advantage of this system is that, when an error occurs in both multiplexing modules 1a and 1b, the control modules 5a and 5b detect the number of errors in each comparator to allow the selection control module 52 to send the output sent from the multiplexing module 1a or 1b which has less errors. This prevents a transport stream (TS) or a program stream (PS) from being disrupted even when an error occurs in both multiplexing module 1a and 1b.

In the above embodiments, a FIFO memory is used to store packets to be multiplexed. This memory may be replaced, as necessary, by another type of memory.

The packet multiplexing system according to the present invention compares the original input data with the input data in the packet using the comparison means to check whether those input data are similar or not. Accordingly, the packet multiplexing system can detect errors lying therebetween without the packet de-multiplexing module serving as the monitor circuit for the input data in the multiplexing system, unlike the conventional arts. As described above, the de-multiplexing module is so large and expensive; a compact and low-cost packet multiplexing system can be available.

Furthermore, the packet multiplexing system synchronizes the original input data with the input data in the packet using the synchronization means, which adjusts output timing of the original input data. Therefore, the packet multiplexing system can detect difference between the original input data and the input data in the packet based on those data synchronized with each other.

Moreover, the packet multiplexing system adjust the output timing of the original input data by a predetermined delay time or a time necessary for packetizing of the original input data, for the purpose of the synchronization. As a result, the packet multiplexing system can accurately confirm the difference between the original input data and the input data in the packet.

For an application of the packet multiplexing system, the packet multiplexing equipment is constructed of a plurality of packet multiplexing systems. The multiplexing equipment detects any faults of one among those packet multiplexing systems, and selects one of the others capable of regular operation. Consequently, even though one of those packet multiplexing systems has malfunctioned, the multiplexing equipment can continue the multiplexing of the data using another packet multiplexing system free of the fault, thereby leading to enhancement of reliability of the multiplexing.

What is claimed is:

1. A packet multiplexing system, comprising:
   a plurality of input data packetizing modules for packetizing input data;
   an output data packetizing module for multiplexing and packetizing data output from the input data packetizing modules, and outputting the multiplexed and packetized data as output data;

a plurality of comparators corresponding respectively to each of the input data packetizing modules, for comparing the output from the input data packetizing modules and the output data; and a plurality of memories, corresponding respectively to each of the input data packetizing modules, each of the memories for delaying the data output from the input data packetizing module to which the memory corresponds, by a time equal to the sum of a time required by the input data packetizing module to create a header of the packetized input data and a time required by the output data packetizing module to packetize the output from the input data packetizing modules.

2. A packet multiplexing system according to claim 1, wherein each of the memories is a first in-first out memory.

3. A packet multiplexing system, comprising:

a plurality of input data packetizing modules for packetizing input data;

an output data packetizing module for multiplexing and packetizing data output from the input data packetizing modules, and outputting the multiplexed and packetized data as output data, wherein each input data packetizing module is a PES packetizing module that packetizes an elementary stream and the output data packetizing module is a TS/PS packetizing module generates a transport stream or a program stream from data output by each of the input data packetizing modules; and a plurality of comparators corresponding respectively to each of the input data packetizing modules, for comparing the output from the input data packetizing modules and the output data.

4. A packet multiplexing system according to claim 3, wherein the PES packetizing modules output the packetized input data as respective individual non-multiplexed elementary streams and the comparators compare the individual elementary streams output by the PES packetizing modules with the respective multiplexed packetized elementary streams output by the TS/PS packetizing module.

5. A packet multiplexing system according to claim 3, further comprising a plurality of memories, corresponding respectively to each of the PES packetizing modules, wherein the PES packetizing modules output the packetized input data as respective individual non-multiplexed packetized elementary streams, wherein each of the memories temporarily store and thereby delay the non-multiplexed packetized elementary stream output from the PES packetizing module to which the memory corresponds, for a time equal to the sum of a time required by the PES packetizing module to create a header of the PES stream and a time required by the TS/PS packetizing module to multiplex the PES streams output from the PES packetizing modules, and each comparator extracts a part of the transport stream or program stream output by the TS/PS packetizing module corresponding to the packetized elementary stream and compares said part with the individual non-multiplexed packetized elementary stream stored in the memory corresponding to the PES packetizing module.

6. A packet multiplexing system, comprising:

a plurality of input data packetizing modules for packetizing non-packetized input data;

an output data packetizing module for multiplexing and packetizing data output from the input data packetizing modules, and outputting the multiplexed and packetized data as output data;

a first plurality of comparators corresponding respectively to each of the input data packetizing modules, for comparing the output from the input data packetizing modules and the output data; and a second plurality of comparators, corresponding respectively to each of the input data packetizing modules, each of the second plurality of comparators for comparing the non-packetized input data input thereto to the packetized data output therefrom, and checking for errors in the packetized data.

7. A packet multiplexing system, comprising:

a first multiplexing module and a second multiplexing module, each for in parallel packetizing and multiplexing a same plurality of non-packetized data streams, wherein the first multiplexing module includes first input data packetizing modules for receiving and packetizing the non-packetized data streams to obtain first packetized data streams, and first comparators for comparing the non-packetized data streams prior to packetizing and the first packetized data streams, and the second multiplexing module includes second input data packetizing modules for packetizing the non-packetized data streams to obtain second packetized data streams, and second comparators for comparing the non-packetized data streams and the second packetized data streams;

first and second checking control modules that receive results of the comparing respectively by the first and second comparators, and error check the results for errors in the first and second packetized data streams; and a selection control module that receives error checking results from the checking control modules, and that selects one of the first and second multiplexing modules based on the received error checking results.

8. A packet multiplexing system according to claim 7, wherein the first checking control modules detect respective numbers of errors in the packetized data streams respectively received by the first and second comparators, and the selection control module selects the one of the first and second multiplexing modules obtaining the packetized data streams with the least number of errors.

* * * * *